INFORMATION STORAGE DEVICES USING DELAY LINES

Filed April 4, 1966 3 Sheets-Sheet 1

Inventors
M. W. GRIBBLE
D. G. WHITEHEAD
By Cameron, Kerkam & Sutton
Attorneys

Inventors
M. W. GRIBBLE
D. G. WHITEHEAD
By Cameron, Kerkam & Sutton
Attorneys

Inventors
M. W. GRIBBLE
D. G. WHITEHEAD
By Cameron, Kerkam & Sutton
Attorneys

United States Patent Office 3,471,835

Patented Oct. 7, 1969

3,471,835
INFORMATION STORAGE DEVICES USING DELAY LINES

Maurice Woolmer Gribble and Donald Gill Whitehead, Stockport, England, assignors to Ferranti, Limited, Hollinwood, Lancashire, England, a company of the United Kingdom of Great Britain and Northern Ireland Filed Apr. 4, 1966, Ser. No. 539,800
Claims priority, application Great Britain, Apr. 5, 1965, 14,298/65
Int. Cl. G11c *21/02*
U.S. Cl. 340—173 10 Claims

ABSTRACT OF THE DISCLOSURE

An information storage device having a plurality of storage delay lines wherein each delay line has a capacity of *n* bits of information stored at *n* addresses, such that *n* characters may be stored with all the bits of one character stored at the same address of the storage delay lines. The information is supplied to, and read from, the storage delay lines in parallel form. Address control means is provided so that the information is supplied to, or read from, the storage delay lines at times corresponding to the presence of the selected one of said *n* addresses respectively at input means or output means associated with the delay lines.

This invention relates to information storage devices. More specifically the invention relates to information storage devices using delay lines.

The storage of information as pulses on a delay line is well known. When using an electromagnetic delay line of given cross-section the rise time of pulses traversing the line is inversely proportional to the square of the length of the delay line, assuming that the attenuation is entirely due to the skin resistance. It is therefore desirable to use the shortest delay line possible to store the required number of bits of information. The length of line required to store a given number of bits is determined by the pulse repetition frequency or clock frequency of the storage pulses since the higher the clock frequency the shorter will be the spacing between adjacent pulse positions or addresses on the delay line.

It is an object of the present invention to provide an information storage device using delay lines in which information may be stored as pulses at a high clock frequency.

According to the present invention an information storage device includes a plurality of storage delay lines of equal length, each delay line having a capacity of *n* bits of information stored at *n* addresses on said delay line at a clock frequency of *f* cycles per second, regeneration means for regenerating information stored on said delay lines, inhibit means for inhibiting the operation of said regeneration means, input means for controlling the writing of information into each of said delay lines in parallel, output means for controlling the reading of information from each of said delay lines in parallel, and address control means for controlling said input means at times corresponding to the presence of any selected one of said *n* addresses at said input means and for controlling said output means at times corresponding to the presence of any selected one of said *n* addresses at said output means.

Said address control means may also control the operation of said inhibit means to clear an address before information is written into that address.

Figure 1:
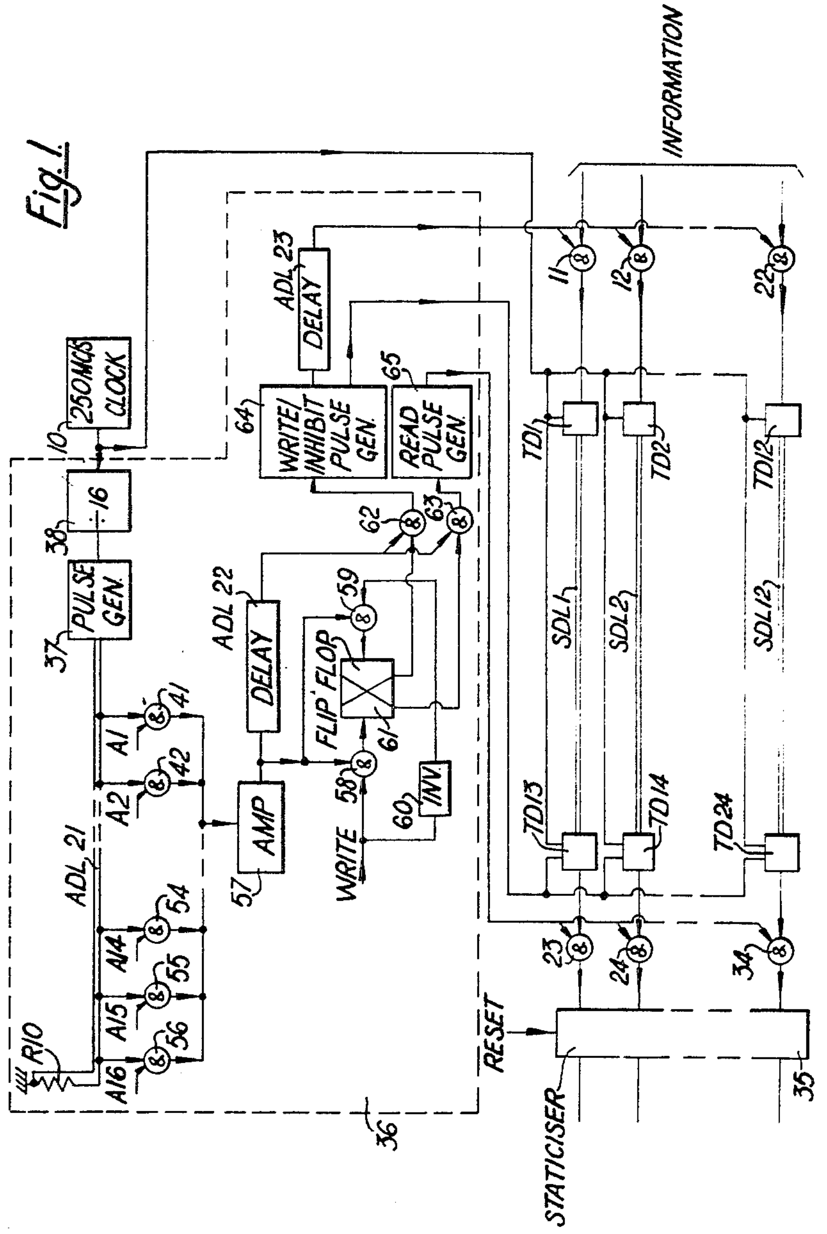
Figures 2, 4, 5:
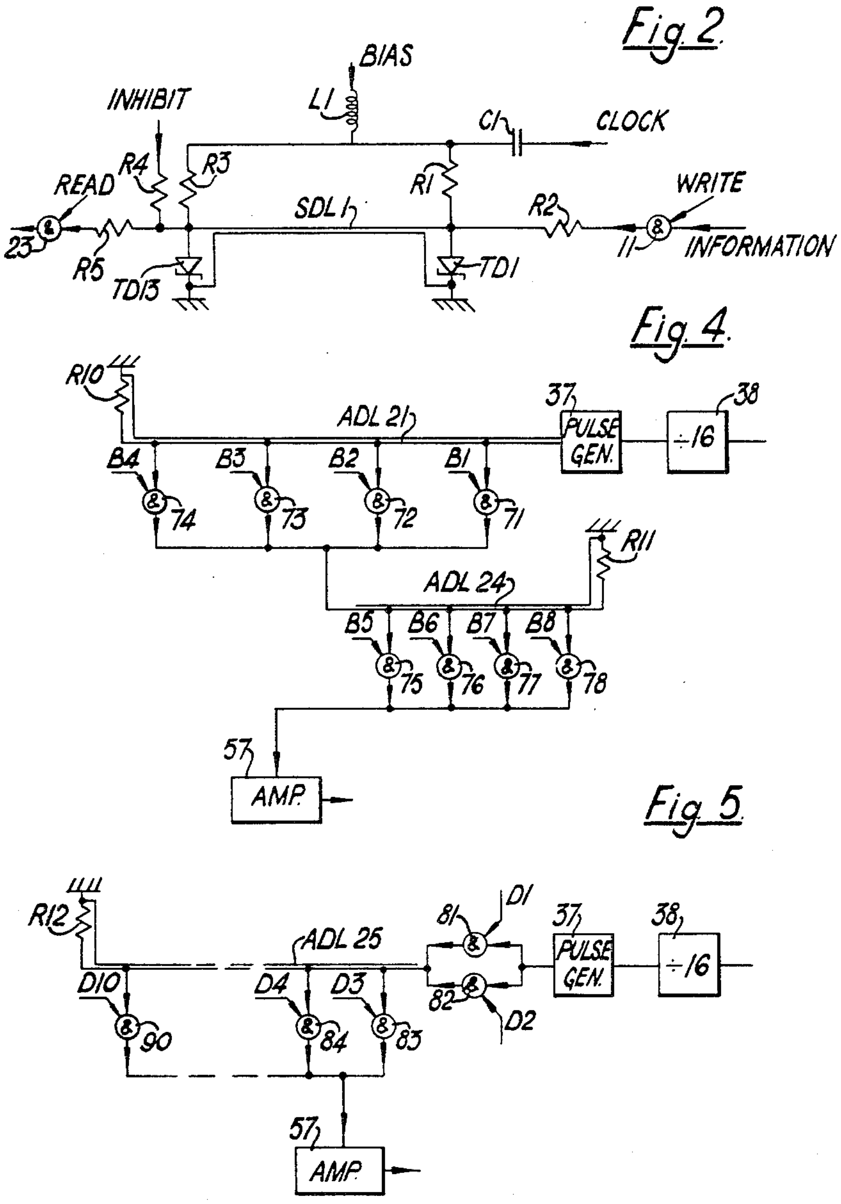
Figure 3:
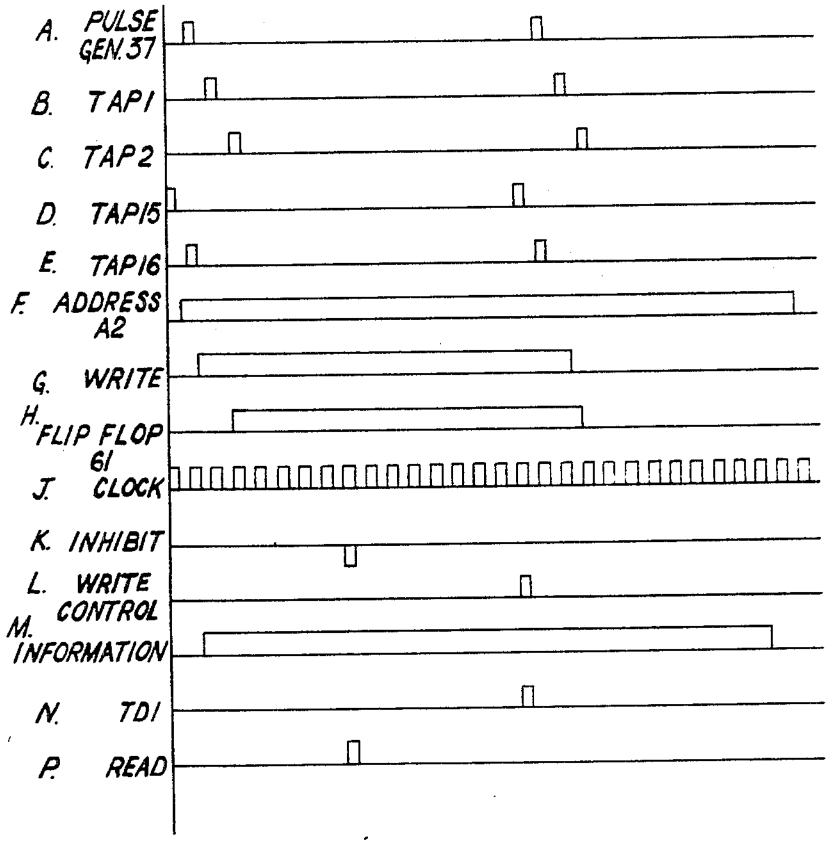

The present invention will now be described by way of example with reference to the accompanying drawings in which:

FIGURE 1 is a schematic diagram showing an information storage device using delay lines in accordance with the invention, FIGURE 2 shows the connections to one of the delay lines shown in FIGURE 1, FIGURE 3 is a waveform diagram for illustrating the operation of the storage device shown in FIGURE 1, and FIGURES 4 and 5 show modifications to the address control means shown in FIGURE 1.

Referring now to the drawings, the information storage device shown includes twelve storage delay lines of which only three SDL1, SDL2 and SDL12 are shown. Each of the delay lines SDL1 . . . SDL12 is in the form of a printed strip transmission line and each has a length of thirty-two nanoseconds giving an effective length of sixty-four nanoseconds, i. e., the time taken for a pulse written into one end of the line to travel along the line and return to the input end. Tunnel diodes TD1 . . . TD24 are provided at the ends of the delay lines SDL1 . . . SDL12 for regeneration of pulses on the delay lines and the tunnel diodes are connected to the output of a 250 mc./s. clock pulse generator 10. Twelve double input AND gates 11, 12 . . . 22 each having one input connected to an information source have their outputs connected to the tunnel diodes TD1 . . . TD12 at the input ends of the delay lines SDL1 . . . SDL12, and the tunnel diodes TD13 . . . TD24 at the output ends of the delay lines SDL1 . . . SDL12 are connected respectively to one input of twelve double input AND gates 23, 24 . . . 34 which have their outputs connected to a staticiser 35. The second inputs of the AND gates 11 . . . 22 are connected in parallel to the write control output from an address control means generally designated 36 and the second inputs of the AND gates 23 . . . 34 are similarly connected in parallel to a read control output from the address control means 36 which also has an inhibit output connected to the twelve tunnel diodes TD13 . . . TD24 at the output ends of the delay lines SDL1 . . . SDL12.

FIGURE 2 shows the detailed connections to the delay line SDL1. The tunnel diodes TD1 and TD13 are connected across the ends of the delay line and have their negative poles earthed. The positive pole of the tunnel diode TD1 is connected via a resistor R1 and capacitor C1 to the clock pulse generator and via a resistor R2 to the output of the AND gate 11. The positive pole of the tunnel diode TD13 is connected via a resistor R3 and the capacitor C1 to the clock pulse generator, via a resistor R4 to the inhibit output of the address control means 36 (FIGURE 1) and via a resistor R5 to one input of the AND gate 23. The line connecting resistors R1 and R3 are connected via a choke L1 to a source of D.C. bias potential which, in operation, has the effect of shifting the mean level of the clock pulses thereby applying a bias to the tunnel diodes TD1 and TD13. The bias on the tunnel diode TD1 is such that the occurrence of a pulse on the delay line SDL1 in coincidence with a clock pulse causes the tunnel diode TD1 to conduct for the duration of the clock pulse and transmit a regenerated pulse along the delay line. The occurrence of an output from the AND gate 11 in coincidence with a clock pulse also causes the tunnel diode TD1 to conduct for the duration of the clock pulse and transmit a pulse along the delay line SDL1. Similarly, the bias on the tunnel diode TD13 is such that the occurrence of a pulse on the delay line SDL1 in coincidence with a clock pulse causes the tunnel diode TD13 to conduct for the duration of the clock pulse and transmit a regenerated pulse along the delay line and also to apply a pulse to one input of the double input AND gate 23. The application of an inhibit pulse via the resistor R4 prevents the tunnel diode TD13 from conducting such that a pulse on the delay line SDL1 is not regenerated and is thereby effectively erased. The detailed connections to the other delay lines SDL2 . . . SDL12 are similar to those described above for the delay line SDL1.

Since each of the delay lines SDL1 . . . SDL12 has an effective length of sixty-four nanoseconds, as previously stated, and since the clock pulses have a repetition frequency of 250 mc./s., i.e., a cycle time of four nanoseconds, each line has a capacity of sixteen bits of information stored as two nanosecond pulses at sixteen addresses on the delay line. By an address is meant a particular two nanosecond period in the sixty-four nanosecond cycle circulating within the delay line.

The address control means 36 includes a delay line ADL21 having a length of sixty-four nanoseconds and terminated at one end with a resistor R10 having a value equal to the characteristic impedance of the delay line. The other end of the delay line ADL21 is connected to the output of a pulse generator 37 which is triggered by the output from a divider circuit 38 which divides by sixteen the output from the clock pulse generator 10. The delay line ADL21 has sixteen tappings spaced at four nanosecond intervals along the delay line and these tappings are connected to the first inputs of sixteen double input AND gates 41 . . . 56 of which only five are shown. The second inputs of the AND gates 41 . . . 56 are connected to sixteen address inputs A1 . . . A16 and the outputs of the AND gates 41 . . . 56 are connected to the input of an amplifier 57. The output from the amplifier 57 is connected to the first inputs of two double input AND gates 58, 59, the second input of the AND gate 58 being connected to a WRITE signal source and the second input of the AND gate 59 being connected to the WRITE signal source via an inverter 60. The outputs of the AND gates 58, 59 are connected to the control inputs of a flip flop 61. The output from the amplifier 57 is also connected via a delay line ADL22, having a delay time of fifteen nanoseconds, to the first inputs of double input AND gates 62, 63 the second inputs of which are connected to the set and re-set outputs respectively of the flip flop 61. The output of the AND gate 62 is connected to the input of a WRITE/INHIBIT pulse generator 64, the inhibit output of which is connected to the tunnel diodes TD13. . . TD24 as previously described. The write output of the pulse generator 64 is connected via a delay line ADL23, having a delay time of thirty-two nanoseconds, to the second inputs of the AND gates 11 . . . 22 as previously described. The output of the AND gate 63 is connected to a READ pulse generator 65 the read output of which is connected to the second inputs of the AND gates 23 . . . 34 as previously described.

In operation the flip flop 61 is normally in its reset condition. The dividing circuit 38 gives an output every sixty-four nanoseconds causing the pulse generator 37 to apply a two nanosecond pulse to the delay line ADL21 as shown at A in FIGURE 3 of the drawings. Each pulse travels along the delay line and is dissipated in the characteristic impedance R10 and therefore each tapping point receives a pulse every sixty-four nanoseconds, the pulses received at the second tapping point being delayed by four nanoseconds from those at the first tapping point and so on to the pulses at the sixteenth tapping point, the pulses at the first, second, fifteenth and sixteenth tapping points being shown at B, C, D, E. Four nanoseconds after a pulse is received at the sixteenth tapping point the next pulse is received at the first tapping point.

To write a twelve bit word into the information storage device an address pulse, shown at F, FIGURE 3, is applied to the required address input, say A2, at any required time and subsequently a write pulse G, FIGURE 3, having a duration longer than sixty-four nanoseconds is applied to the WRITE input. Some time after the address pulse is applied to the address input A2 a pulse is received at the second tapping point on the delay line ADL21. This opens AND gate 42 and a pulse is applied to the amplifier 57. If the write pulse is not present on the WRITE input the flip flop 61 remains in its reset condition and a non-destructive read operation occurs, as described later. If the write pulse is present on the WRITE input the output from the amplifier 57 opens the gates 58 and 59 and causes the flip flop 61 to change to its set condition, H, FIGURE 3, applying one input to AND gate 62. The second input to the AND gate 62 is delayed for fifteen nanoseconds by the delay line ADL22, this delay being necessary to ensure that the flip flop 61 has changed to its set condition. The output from AND gate 62 is applied to the WRITE/INHIBIT pulse generator 64 and causes an inhibit pulse, K, FIGURE 3, to be applied to the tunnel diodes TD13 . . . TD24 in coincidence with a clock pulse, J. FIGURE 3, and at the same time as the address A2 on the delay lines SDL1 . . . SDL12 is present at these tunnel diodes. The tunnel diodes TD2 . . . TD24 are therefore inhibited from regenerating any pulses present at this address on the delay lines SDL1 . . . SDL12 and thirty-two nanoseconds later the cleared address is present at the tunnel diodes TD1 . . . TD12. At the same time as the cleared address is present at the tunnel diodes TD1 . . . TD12 the write control pulse output, L, FIGURE 3, from the WRITE/INHIBIT pulse generator 64 which has been delayed for thirty-two nanoseconds is applied to the AND gates 11 . . . 22. The twelve binary bits of a word to be stored are applied in parallel to the AND gates 11 . . . 22, the binary noughts being represented by zero input and the binary ones being represented by positive going pulses, M, FIGURE 3, commencing at the same time as the write pulse input and having a duration at least thirty-two nanoseconds longer than the write pulse to ensure that information is present at the AND gates when a write control pulse is received after delay in the delay line ADL23. The write control pulse opens those gates 11 . . . 22 at which a binary one is present and the resultant outputs, in combination with a clock pulse, cause the operation of the appropriate ones of the tunnel diodes TD1 . . . TD12 to write the word into the twelve delay lines SDL1 . . . SDL12 at the address A2, the operation of the tunnel diode TD1 being shown at N, FIGURE 3. If the write signal is removed before the arrival of the next pulse at the second tapping point on the delay line ADL21 is flip flop 61 is changed to its reset condition and the address pulse may then be removed, the information at the address A2 continuing to circulate in the delay lines SDL1 . . . SDL12. If, however, the write and address pulses are not removed before the arrival of the next pulse at the second tapping point on the delay line ADL21 there are further inhibit and write control outputs occurring sixty-four nanoseconds after the previous outputs. The tunnel diodes TD13 . . . TD24 are therefore inhibited from operating and the word which is written in the address A2 is effectively erased and then rewritten when the address A2 is again present at the tunnel diodes TD1 . . . TD12. The duration of the write and address signals is therefore not critical provided that the write pulse has a duration of longer than sixty-four nanoseconds and the address pulse has a longer duration than the write pulse to ensure that a pulse is received at the required tapping point on the delay line ADL21 during the application of the address and write signals.

To read a word written into the storage device it is only necessary to apply an address pulse to the required address input and then reset the staticiser 35, the address pulse having a duration of more than sixty-four nanoseconds after the staticiser 35 has been cleared. In the absence of any pulse on the WRITE input the flip flop 61 is in its reset condition and a signal is applied to one input of the AND gate 63. Therefore, after the application of the address pulse to the address input A2 the receipt of a pulse at the second tapping point on the delay line ADL21 opens the gate 42 and applies a two nanosecond pulse to the amplifier 57. The output from the amplifier 57, after a fifteen nanoseconds delay caused by the delay line ADL22, opens the gate 63 and the resultant output triggers the READ pulse generator 65. Consequently a read control pulse, P, FIGURE 3, is applied to the AND gates 23 . . . 34 at the same time as the address A2 is present at the tunnel diodes TD13 . . . TD24. Those of the tunnel diodes TD13 . . . TD24 connected to the delay lines SDL1 . . . SDL12 on which a binary one is stored at this address are operated and open the associated ones of the AND gates 23 . . . 34 applying the required inputs to the staticiser 35 from which the output may be read in serial or parallel form as required. The read out operation is non-destructive and the pulses are regenerated and transmitted along the delay lines SDL1 . . . SDL12 by the operation of the tunnel diodes TD13 . . . TD24. If the address pulse is removed from the address input A2 before the receipt of the next pulse at the second tapping point on the delay line ADL21 and AND gates 23 . . . 34 remain closed the next time the address A2 is present at the tunnel diodes TD13 . . . TD24. If, however, the address pulse is not removed before the arrival of the next pulse at the second tapping point on the delay line ADL21 the AND gate 42 will be opened and cause a further output from the READ pulse generator 65 sixty-four nanoseconds after the previous output. This will occur at the same time as the address A2 on the delay lines SDL1 . . . SDL12 is present at the tunnel diodes TD13 . . . TD24 and the same information will therefore be applied to the inputs of the staticiser 35. The length of the address pulse for reading from the store is therefore also not critical provided it has a duration of longer than sixty-four nanoseconds after the staticiser 35 has been cleared.

Information may be written into and read from any one of the other fifteen addresses on the delay lines SDL1 . . . SDL12 by the application of an address pulse to the appropriate address input and, in the case of writing information into the storage device, the subsequent application of a write pulse to the WRITE input.

In the above description the delays occurring in the circuit components other than delay lines, such as delays in the interconnections or in the amplifier 57, have been ignored. In practice, however, it is necessary to allow for these delays and one convenient manner in which this may be achieved is to provide the WRITE/INHIBIT pulse generator 64 and the READ pulse generator 65 with a variable phase control. When the storage device is initially set up the outputs from the pulse generators 64 and 65 may then be adjusted to ensure that the control pulses are received at the AND gates 11 . . . 34 and the tunnel diodes TD1 . . . TD24 at the correct times.

Referring now to FIGURE 4 there is shown a modification of the address control means 36 to reduce the number of AND gates required. In this modification the delay line ADL21 has only four tappings spaced at sixteen nanosecond intervals along the delay line and these tappings are connected to the first inputs of four double input AND gates 71, 72, 73, 74. The second inputs of the AND gates 71 . . . 74 are connected to four address inputs B1, B2, B3, B4 and the outputs of the AND gates 71 . . . 74 are connected to the input of a further delay line ADL24 having a length of sixteen nanoseconds. The delay line ADL24 is terminated by a resistor R11 having a value equal to the characteristics impedance of the line and has four tappings spaced at four nanosecond intervals along the delay line. These tappings are connected to the first inputs of four double input AND gates 75, 76, 77, 78 the second inputs of which are connected to four further address input B5, B6, B7, B8. The outputs of the AND gates 75 . . . 78 are connected to the input of the amplifier 57 and the remainder of the circuit is as shown in FIGURE 1.

In operation an address is selected by applying an address pulse to one of the address inputs B1 . . . B4 and to one of the address inputs B5 . . . B8. To select the fourth address, for example, and address pulse is applied to address inputs B1 and B8. When a pulse is received at the first tapping on the delay line ADL21 the gate 71 is opened and the resultant pulse output is applied to the delay line ADL24. When this pulse reaches the fourth tapping point the gate 78 is opened and there is an input to the amplifier 57. To select the fifth address an address pulse is applied to address inputs B2 and B5. The pulse received at the second tapping on the delay line ADL21 is delayed sixteen nanoseconds longer than a pulse received at the first tapping and is thereafter subject to the same delay in passing through the gate 72 to the input of the delay line ADL24. The pulse is therefore received at the first tapping on the delay line ADL24 four nanoseconds later in the sixty-four nanosecond cycle than a pulse is received at the fourth tapping via the AND gate 71. In this manner the full sixteen addresses may be obtained with the use of eight AND gates instead of sixteen as required in FIGURE 1. This modification is important where a larger number of words are stored. For example, sixty-four addresses could be obtained with the use of only sixteen AND gates.

Referring now to FIGURE 5 there is shown a further modification to the address control means 36 by means of which the length of the dalay line ADL21 may be reduced. In this modification the pulse generator 37 produces a negative going pulse thirty-two nanoseconds after each positive going pulse. The output of the pulse generator 37 is connected to the first inputs of two double input AND gates 81, 82 the second inputs of which are connected to address inputs D1, D2. The AND gates 81 responds to an address input and a positive going pulse input to provide a positive going pulse output and the AND gate 82 responds to an address input and a negative going pulse input to produce a positive going pulse output. The outputs of the AND gates 81, 82 are applied to the input of a delay line ADL25 having a length of thirty-two nanoseconds and terminated by a resistor R12 having a value equal to the characteristic impedance of the delay line. The delay line ADL25 has eight tappings spaced at four nanosecond intervals along the length of a delay line and these tappings are connected to the first inputs of eight double input AND gates 83 . . . 90 of which only three are shown. The second inputs of the AND gates 83 . . . 90 are connected to eight address inputs D3 . . . D10 and the outputs of the AND gates 83 . . . 90 are connected to the input to the amplifier 57. The remainder of the circuit is as shown in FIGURE 1.

In operation any one of the first eight addresses is selected by applying an address pulse to the address input D1 and the appropriate one of the address inputs D3 . . . D10. Any one of the second eight addresses is selected by applying an address pulse to the address input D2 and the appropriate one of the address inputs D3 . . . D10 and since the output of the AND gate 82 is delayed by thirty-two nanoseconds from the output from the AND gate 81 the correct timing sequence is obtained for the sixteen addresses. In this manner the required length of the address delay line is halved and the delay line ADL25 may be similar to the storage delay lines SDL1 . . . SDL12.

The storage devices described above thus permit the storage of information at a high clock frequency and yet permit the writing of information into and the reading of information from any required address by means of pulses of comparatively long and non-critical duration. The number of words stored in the storage devices described may be changed by changing the clock frequency or by changing the length of the storage delay lines, the address control means being changed accordingly. Also, the number of bits per word may be changed by changing the number of storage delay lines.

What we claim is:

1. An information storage device including a plurality of storage delay lines of equal length, each delay line having a capacity of $n$ bits of information stored at $n$ addresses on said delay line at a clock frequency of $f$ cycles per second, regeneration means for regenerating information stored on said delay lines, inhibit means for inhibiting the operation of said regeneration means, input means for controlling the writing of information into each of said delay lines in parallel, output means for controlling the reading of information from each of said delay lines in parallel, and address control means for controlling said input means at times corresponding to the presence of any selected one of said $n$ addresses at said input means and for controlling said output means at times corresponding to the presence of any selected one of said $n$ addresses at said output means.

2. An information storage device as claimed in claim 1 in which said address control means also controls the operation of said inhibit means to clear an address before information is written into that address.

3. An information storage device as claimed in claim 2 in which said address control means includes control pulse generating means for generating a control pulse corresponding to any one of said $n$ addresses and delay means having a delay time equal to the time between said address being cleared and being available at said input means for having information written therein, said control pulse being applied directly to control the operation of said inhibit means and via said delay means to control said input means.

4. An information storage device as claimed in claim 3 in which said control pulse generating means includes a pulse generator having a pulse repetition frequency of $f/n$ pulses per second, a further delay line connected to the output of said pulse generator, said further delay line having $n$ tapping points corresponding to said $n$ addresses, the time delay between adjacent tapping points being $1/f$ second, and gating means for selecting any one of said $n$ tapping points.

5. An information device as claimed in claim 4 in which said gating means includes $n$ double input AND gates each having one input connected to an associated one of said tapping points, a particular address being selected by the application of an address pulse to the other input of one of said AND gates.

6. An information storage device as claimed in claim 3 in which said control pulse generating means includes a pulse generator having a pulse repetition frequency of $f/n$ pulses per second, a first further delay line connected to the output of said pulse generator, said first further delay line having $n/x$ tapping points, the time delay between adjacent tapping points being $x/f$ seconds, a second further delay line having $x$ tapping points, the time delay between adjacent tapping points being $1/f$ seconds, first gating means for connecting any one of said tapping points on said first further delay line to the input of said second further delay line, and second gating means for selecting any one of said tapping points on said second further delay line.

7. An information storage device as claimed in claim 6 in which said first gating means includes $n/x$ double input AND gates each having one input connected to an associated one of said tapping points on said first further delay line and its output connected to the input of said second further delay line, and in which said second gating means includes $x$ double input AND gates each having one input connected to an associated one of said tapping points on said second further delay line, a particular address being selected by the application of an address pulse to the other input of one of said $n/x$ AND gates and to the other input of one of said $x$ AND gates.

8. An information storage device as claimed in claim 1 in which said regeneration means includes for each end of each storage delay line a tunnel diode connected across said delay line.

9. An information storage device as claimed in claim 1 in which said input means includes for each storage delay line a double input AND gate having one input connected to the source of information to be stored, the other input connected to said address control means and its output connected to the input of said storage delay line.

10. An information storage device as claimed in claim 1 in which said output means includes for each storage delay line a double input AND gate having one input connected to the output of said storage delay line and its other input connected to said address control means.

References Cited

UNITED STATES PATENTS

| | | | |
|---|---|---|---|
| 2,845,609 | 7/1958 | Newman et al. ---- | 235—165 X |
| 3,054,988 | 9/1962 | Edwards et al. ----- | 340—172.5 |
| 3,153,776 | 10/1964 | Schwartz -------- | 340—173 X |

BERNARD KONICK, Primary Examiner

J. F. BREIMAYER, Assistant Examiner

U.S. Cl. X.R.

235—165; 340—172.5